US007216688B2

(12) United States Patent
Huang

(10) Patent No.: US 7,216,688 B2
(45) Date of Patent: May 15, 2007

(54) REVERSE-STOP MECHANISM OF CURTAIN

(76) Inventor: Hsien-Te Huang, P.O. Box No. 6-57, Junghe, Taipei 235 (TW)

( * ) Notice: Subject to any disclaimer, the term of this patent is extended or adjusted under 35 U.S.C. 154(b) by 237 days.

(21) Appl. No.: 10/928,096

(22) Filed: Aug. 30, 2004

(65) Prior Publication Data

US 2006/0042762 A1 Mar. 2, 2006

(51) Int. Cl.
*E06B 9/30* (2006.01)
*F16H 57/08* (2006.01)

(52) U.S. Cl. ........................... 160/168.1; 160/168.1 R; 475/338

(58) Field of Classification Search ......... 160/168.1 R, 160/168.1 P, 168.1 V, 170, 173 R, 173 V, 160/176.1 V, 178.1 R, 321; 475/338
See application file for complete search history.

(56) References Cited

U.S. PATENT DOCUMENTS 3,774,477 A * 11/1973 Murphy ...................... 475/337
4,657,060 A * 4/1987 Kaucic ................ 160/168.1 V
5,845,695 A * 12/1998 Cadorette et al. ....... 160/173 V
6,405,782 B1 * 6/2002 Cheng .................. 160/168.1 P
6,422,971 B1 * 7/2002 Katou et al. ................ 475/331
6,887,179 B2 * 5/2005 Yamashita et al. .......... 475/338
6,968,884 B2 * 11/2005 Anderson et al. ........... 160/170
6,971,435 B2 * 12/2005 Rasmussen ................. 160/321
7,021,360 B2 * 4/2006 Schroder et al. ...... 160/168.1 P

* cited by examiner

*Primary Examiner*—Hugh B. Thompson, II
*Assistant Examiner*—Candace L. Bradford
(74) *Attorney, Agent, or Firm*—Troxell Law Office, PLLC

(57) ABSTRACT

The present invention relates to a reverse-stop mechanism of a curtain, especially for applying to a sheet- or cloth-type curtain, to rigidly stop a reactive force from a gravitation or an external force and also acquire varied speed output, with a characteristic by connecting a fixed first annular gear with a secondary annular gear of a larger pitch circle diameter, wherein a compound gear set, having two planet gears of varied pitch circle diameters, formed in the middle gearing both annular gears thereof, thereby a backwards rotation of the secondary annular gear will be transmitted, through the compound gear set, to the first annular gear, which stops the rotation. With different pitch circle diameters of the first and the secondary planet gear, power outputs will be transferred to varied speeds.

6 Claims, 7 Drawing Sheets

REVERSE-STOP MECHANISM OF CURTAIN

BACKGROUND OF THE INVENTION (a) Field of the Invention

The present invention relates to a reverse-stop mechanism of a curtain, and more particularly to an application to a vertical or horizontal type curtain that stops transmitting a reverse force, caused by gravitation or an external force, and also outputs varied powers through differential speeds formed by different pitch circle diameters of gears.

(b) Description of the Prior Art

Referring to FIG. 1. To enable a reverse-stop mechanism, a drive assembly 12 is formed in a conventional curtain 1.

Referring to FIG. 2. The drive assembly 12 is driven by operating a bead-chain 121 to rotate a chain wheel 126, which enabling a worm 125 to drive a worm wheel 124. Besides manual operation to provide a rotation force, an electric motor can be used to replace the chain wheel 126.

Referring to FIGS. 1 and 2. Through a transmission stick 122, the drive assembly 12 drives wire-collecting tubes 123, which wind up or down curtain sheets 14 through wires 141. Adjustment of angles of curtain sheets 14 is made by overturn plates 13 to move wires 142.

When blowing by wind, the curtain sheet 14 may slip downwards, transmitting a power through wire-collecting tubes 123 and the transmission stick 122 to slip the drive assembly 12.

The structure shown in FIG. 2 can be a better design till now. While the worm wheel 124, being formed inside the upper horizontal block 11, is slim and small and while the engaging force on the worm wheel 124 is limited to a face of a cog, damages can easily occur on the cog of the worm wheel 124 or the worm 125, thereby causing a slip and even losing locking capability.

The drive assembly 12 can also be applied to a cloth-curtain, which suffers similar wind pressure and self-weight effect, thereby necessitating a reverse-stop function to stop slipping.

Referring to FIGS. 3 and 3A. A horizontal type curtain includes a wire 140, an adjustment stick 120, and an upper horizontal block 11 connecting with a curtain sheet 14, which can be wound up or down by operating the wire 140. By operating the adjustment stick 120 to rotate a worm 125, a worm wheel 124, and a transmission stick 122, an angle of the curtain sheet 14 thereby being adjusted. With the worm 125 gearing the worm wheel 124, the transmission stick 122 thereby being able to resist an external or a self-weight force.

While the curtain can be as high as 30 meters, the adjustment stick 120 can't be that long, due to a packing size constraint, thereby, instead of using the adjustment stick 120, a chain wheel is used.

Referring to FIG. 4. As far as the chain wheel is concerned, a conventional design is to operate a bead-chain 121 to rotate a chain wheel 126 and other drive elements in a direction of the transmission stick 122 through a planet gear set 18. Driving by the chain wheel 126, a sun gear 181 will rotate to drive a planet gear 182 rotating round a fixed annular gear 183, which rotates a wheel disk 180 to drive a shaft 190 connecting to a main thrust shaft 191 through a stop spring 192, thereby enabling the main thrust shaft 191 to drive the transmission stick 122. The stop spring 192 can be de-compressed, when a force from the shaft 190, or compressed to stop transmitting a rotation when a force from the main thrust shaft 191, thereby forming a reverse-stop function.

The stop spring 192 is locked on an end and the de-compression is achieved when a shrinking of the diameter of the spring 192 is made by an external twisting force from the main thrust shaft 191. The design of the stop spring 192 is common in conventional curtains, thereby no further discussion regarding this subject.

The design in FIG. 4 can also be applied to drive structures in FIG. 1 such that by pulling the bead-chain 121 to enable the curtain sheet to wind up or down and also adjust incoming light angles.

With a force by pulling the bead-chain 121 or by wind pressure or self-weight effect in an opposite direction, the stop spring 192 will be de-compressed or compressed, thereby enabling the curtain being wound up or down or adjusted for different light incoming angles or enabling a reverse-stop mechanism. While the compression force and the outer perimeter of the shaft 190 exceeds limits, slipping and losing the reverse-stop capability can be happened.

Referring to FIG. 5. A conventional vertical type curtain includes a drive assembly 12, driven manually by a wire 16, formed on an upper horizontal block 11, wherein curtain sheets 14 suspended through suspension shafts 15.

Referring to FIG. 6. Curtain sheets 14 can be operated through a suspension shaft 15 connecting with a bevel wedge gear 17, to be driven by the drive assembly 12 in order to rotate a transmission stick 171.

When driven by the drive assembly 12, the bevel wedge gear 17 rotates suspension shafts 15 to alter different incoming light angles of curtain sheets. To prevent a wind pressure from causing a reverse driven force transmitting to the drive assembly 12, a structure similar to that in FIG. 2 is formed. As a result, cogs of the worm gear can be damaged, causing a slip and losing reverse-stop capability.

In recent years, other reverse-stop designs were developed, such as using an electromagnetic control switch or other electric automatic devices. As a result, defects can be relaying upon a power supply and also complex in structure.

SUMMARY OF THE INVENTION

It is an objective of the present invention to form a reverse-stop mechanism by connecting a fastened first annular gear with a secondary annular gear of a larger pitch circle diameter, wherein a compound gear set formed in the middle gearing both annular gears thereof, thereby a backwards rotation of the secondary annular gear will be transmitted, through the compound gear set, to the first annular gear, which stops the rotation. With different pitch circle diameters of the first and the secondary annular gear, power outputs will be transferred to varied speeds.

It is another objective of the present invention to enable the drive assembly to drive directly the compound gear set through a rotary disk.

It is yet another objective of the present invention to enable the secondary annular gear being fitted in a fixing disk formed on a base.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 2:
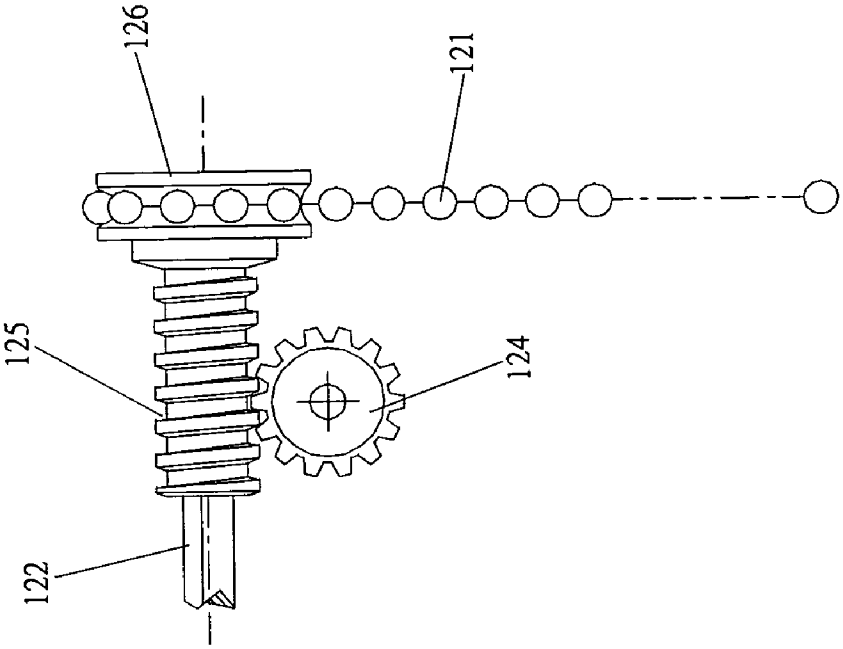
FIG.2 Prior Art
FIG. 2 shows a perspective view of a conventional drive assembly.
Figure 1:
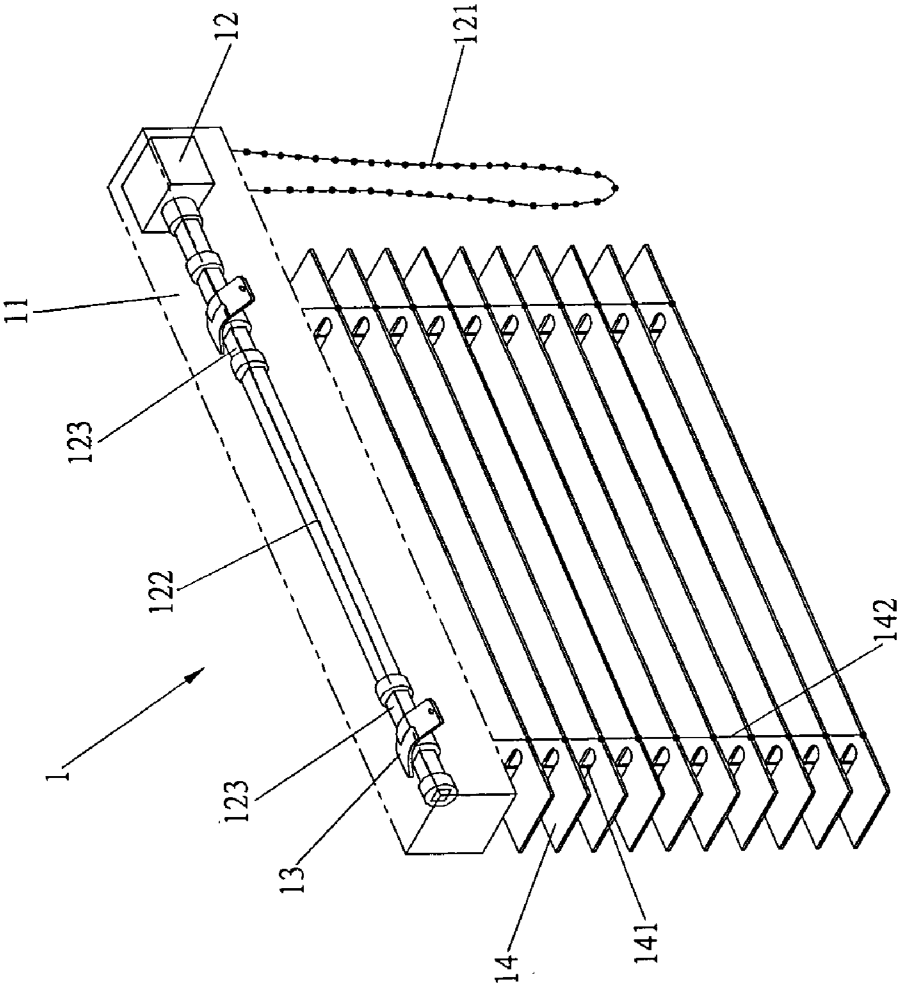
FIG.1 Prior Art
FIG. 1 shows a perspective view of a conventional horizontal type curtain.
Figure 3A:
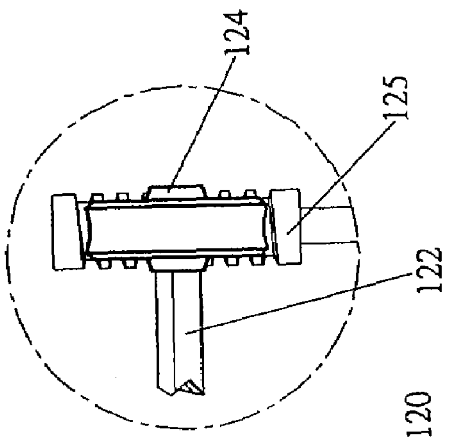
FIG.3A Prior Art
FIG. 3A shows an enlarged view of FIG. 3.
Figure 3:
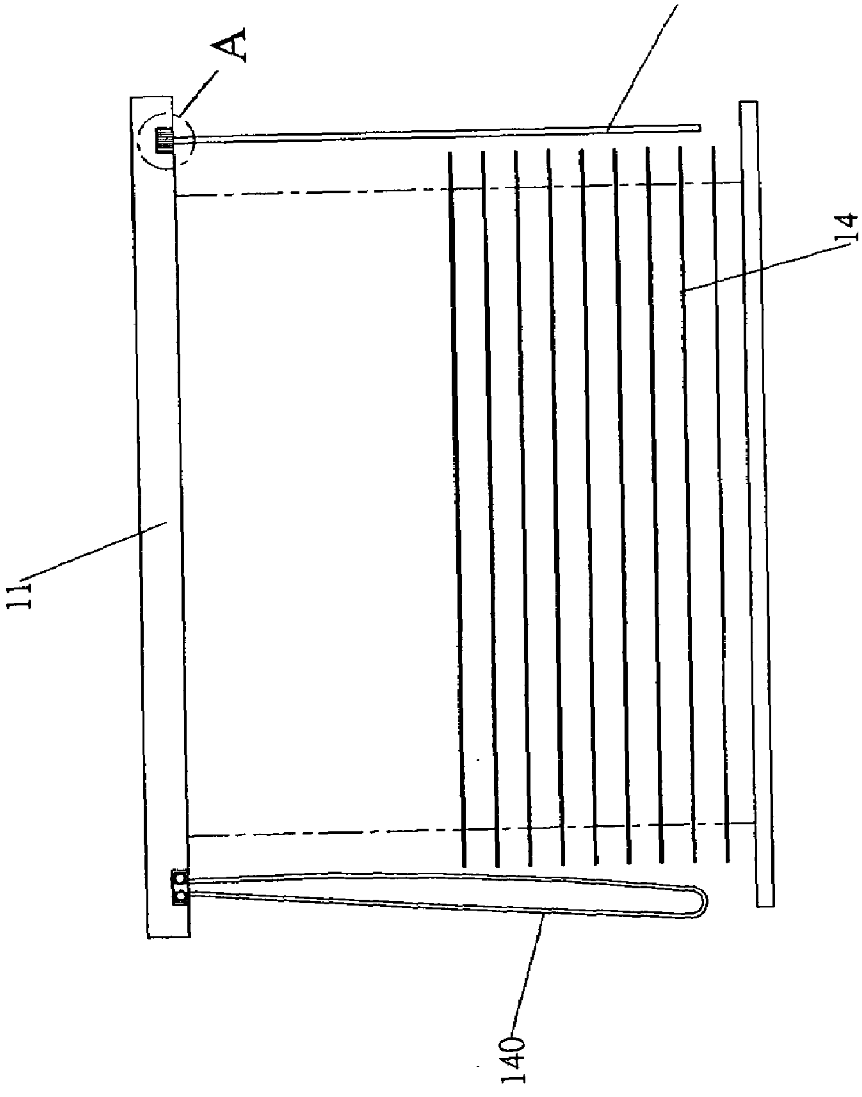
FIG.3 Prior Art
FIG. 3 shows a perspective view of another conventional horizontal type curtain.
Figure 4:
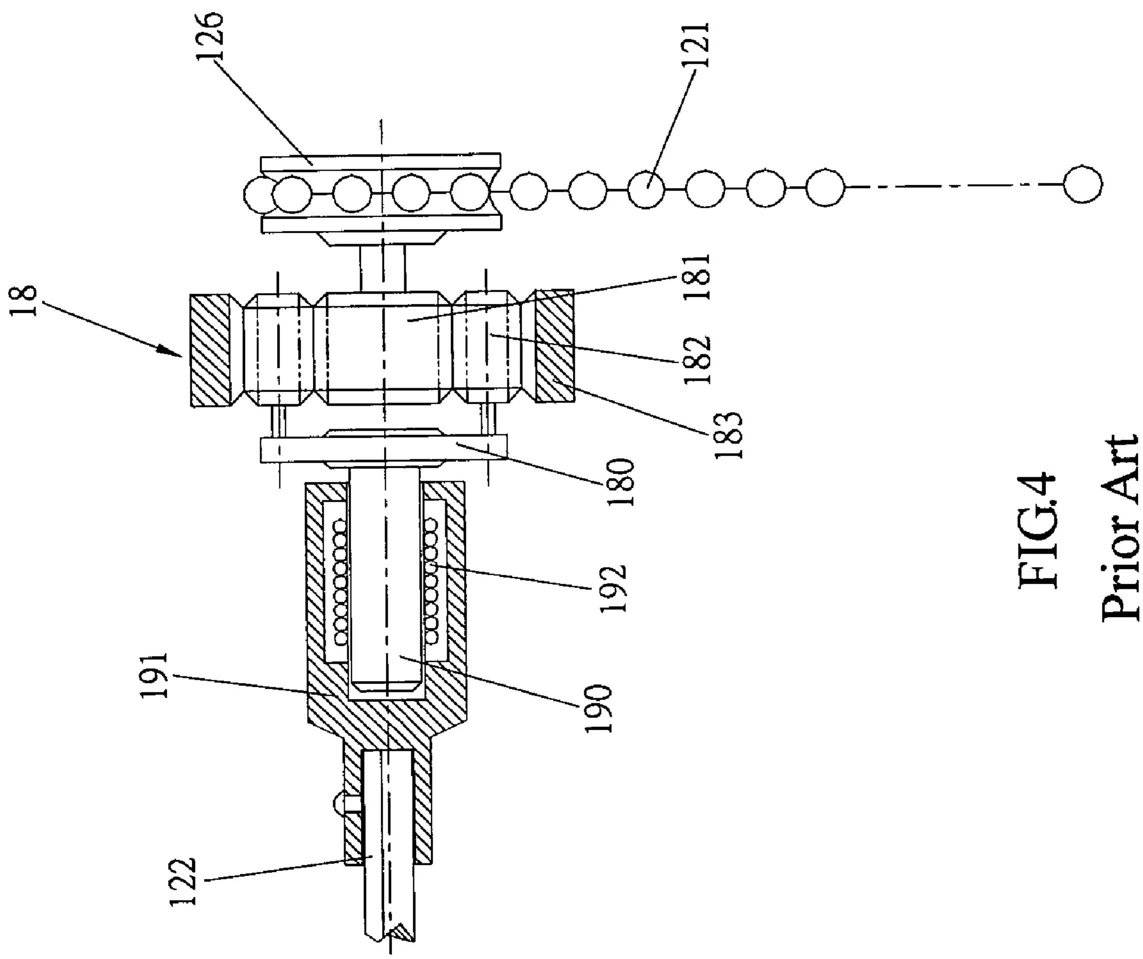
FIG.4 Prior Art
FIG. 4 shows a perspective view of a conventional curtain being driven by pulling a bead-chain.
Figure 6:
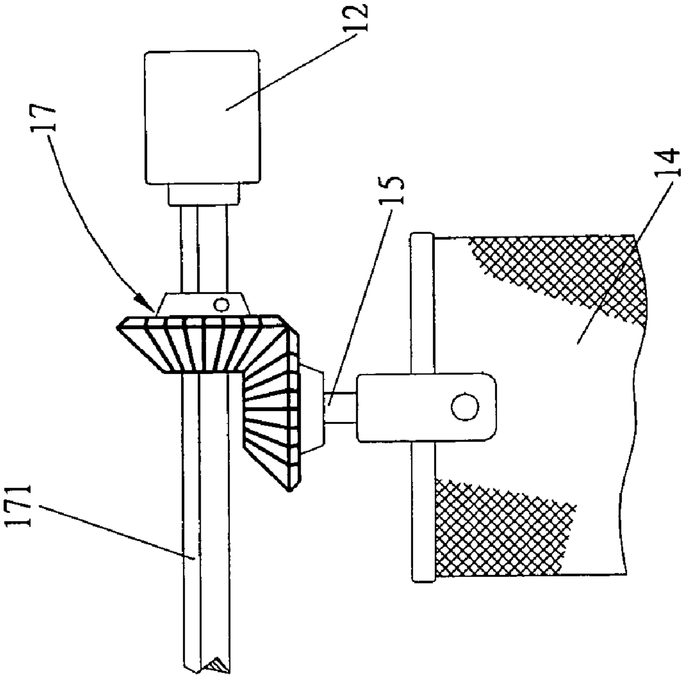
FIG.6 Prior Art
FIG. 6 shows a perspective view of an angle adjustment structure of a conventional vertical type curtain.
Figure 5:
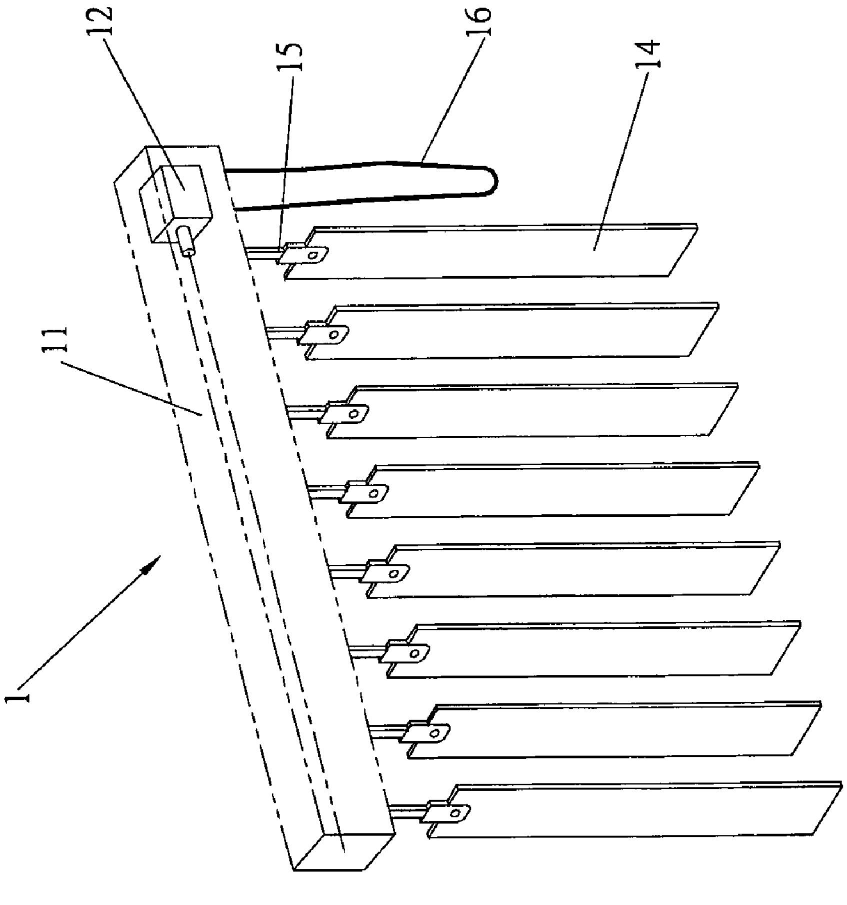
FIG.5 Prior Art
FIG. 5 shows a perspective view of a conventional vertical type curtain.
Figure 7:
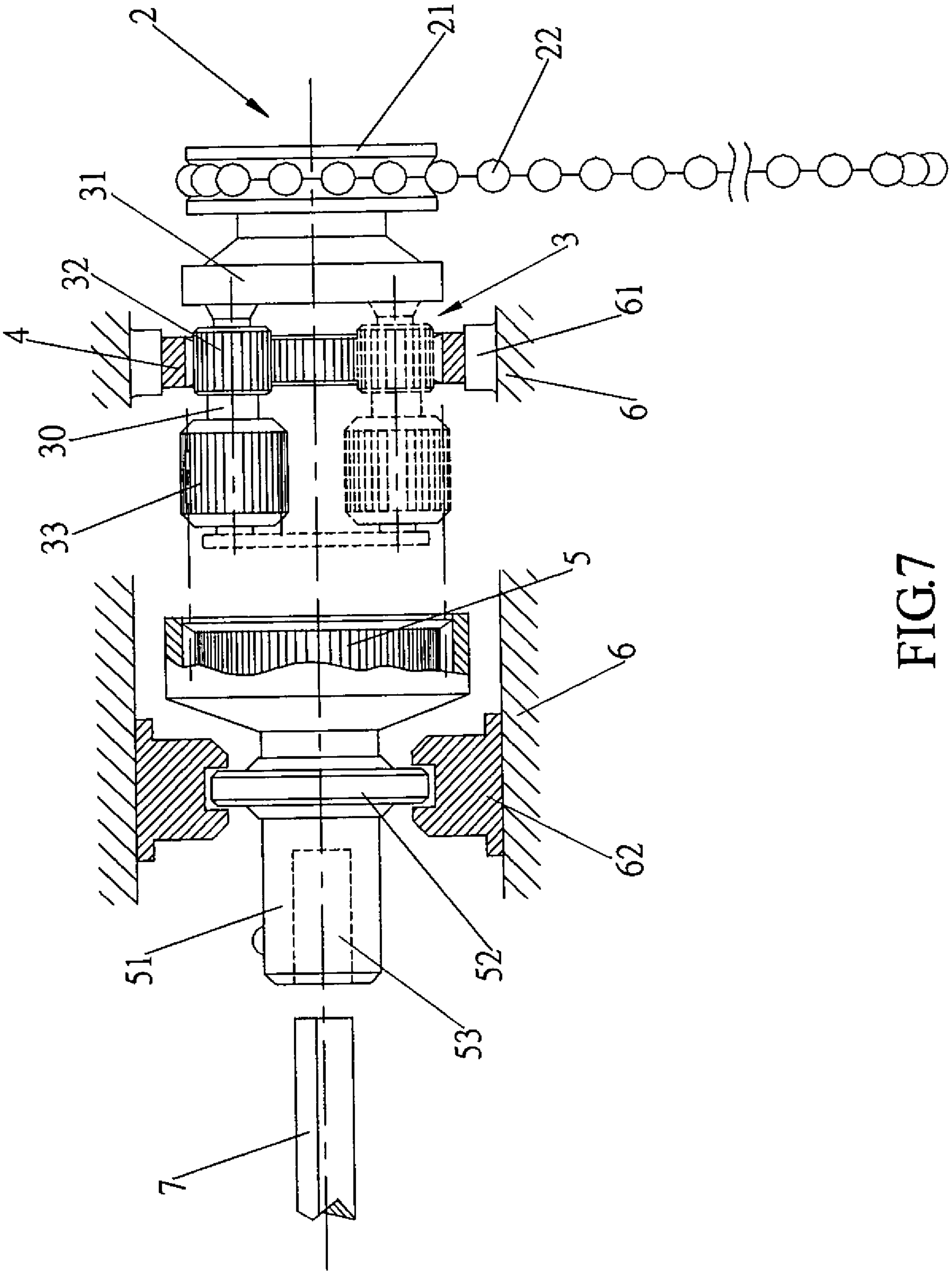
FIG. 7 shows a perspective view of a driving mechanism of the present invention.

Referring to FIG. 7. The present invention is to use a drive assembly 2 through a differential gear set to drive a transmission shaft 7 and also form a reverse-stop mechanism when having a reverse force from the transmission shaft 7, thereby preventing curtain sheets from slipping or altering incoming light angles.

The present invention is to utilize the drive assembly 2 to drive a compound gear set 3, a secondary annular gear 5, a shaft connector 51, and the transmission shaft 7 inserted in a plug-in hole 53, thereby enabling curtain sheets to be wound up or down or to be adjusted angles of the curtain sheet. On the contrary, a reverse force from a transmission shaft 7 will be transmitted through the compound gear set 3 to a first annular gear 4, which stops the rotation, thereby achieving a rigid reverse-stop mechanism.

The compound gear set can be a planet gear set such as an eccentric planet gear set in this example, which includes the first annular gear 4 fastened by a fixture 61 fixed on a case 6, the secondary annular gear 5 fitted in the case 6 in any feasible way, and the compound gear set 3 formed in the middle, wherein the compound gear set 3 includes a first planet gear 32 connecting with a secondary planet gear 33 by a shaft 30 to form an united body eccentrically connecting with a rotary disk 31.

A structure of planet gear set as recited above, wherein the secondary annular gear 5 connects through a fixing disk 52, being restrained in X-, Y-, and Z-direction movements by a base 62, to the shaft connector 51 engaging with the shaft 7, thereby an axial force from the shaft 7, which is common in conventional curtains, will be blocked at the fixing disk 52 without being able to transmit further.

With the compound gear set 3 comprising of the first planet gear 32 co-axially connecting with the secondary planet gear 33 of a larger pitch circle diameter, and with a pitch circle diameter of the first annular gear 4 equaling to a diameter of the compound gear set 3, as well as with a pitch circle diameter of the secondary annular gear 5 larger than that of the secondary planet gear 33, number of cogs will be formed differently for gears thereof gearing together when having an equal gear module.

When the drive assembly 2 rotates, the compound gear set 3 rotates accordingly round the first annular gear 4, which drives the first planet gear 32 co-axially revolving and the secondary planet gear 33 round the shaft 30, wherein the secondary planet gear 33 has a larger circumference speed for having a larger pitch circle diameter. When the drive assembly 2 rotates, a revolution of the rotary disk 31 is formed to rotate the compound gear set 3. With the secondary planet gear 33 revolving driven by the shaft 30 and also by the rotary disk 31, the secondary planet gear 33 thereby being able to drive the secondary annular gear 5, which drives the shaft 7.

Backwards, a rotation of the shaft 7 drives the secondary annular gear 5, the compound gear set 3, and, finally, the first annular gear 4, which is fastened by a fixture 61 fixed on a case 6, thereby stopping the rotation of the shaft 7.

When having a manual design, the drive assembly 2 can be connected directly with the rotary disk 31 to obtain a higher rotating speed. To enhance a driving speed between the rotary disk 31 and a chain wheel 21, a speed-increasing gear set can be formed within.

The chain wheel 21 as recited above for a manual design is driven by pulling the bead-chain 22.

Figure 8:
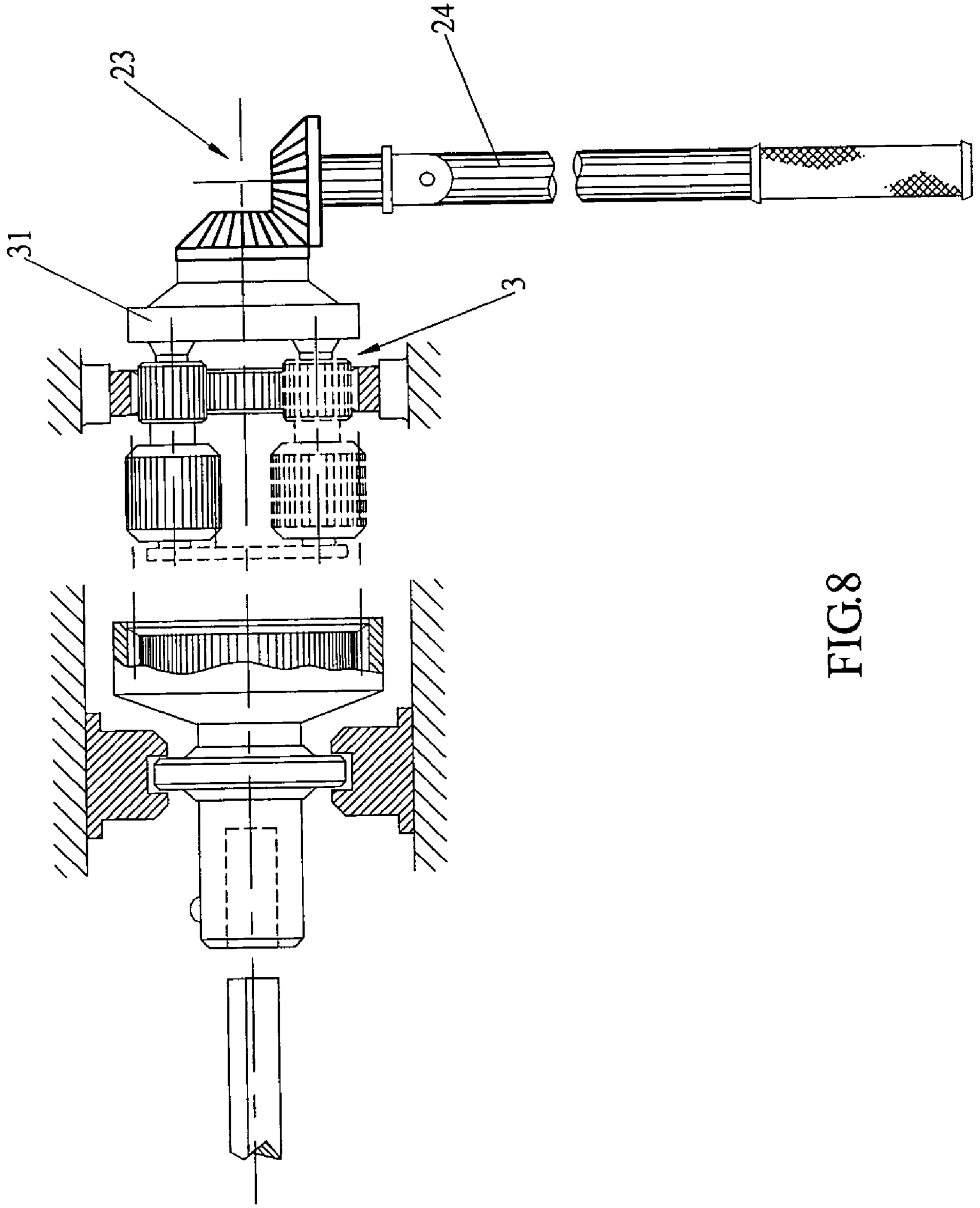
FIG. 8 shows a perspective view of the driving mechanism of anther application of the present invention.

Referring to FIG. 8. When having a manual design, a rotary disk 31 can be connected with the bevel wedge gear 23, wherein a handle 24 formed on an end for rotating manually. By swapping gears or changing gears' size of the bevel wedge gear 23, or by incorporating any design in augmenting gear revolution, a varied rotation speed of the rotary disk 31 can be obtained.

Figure 9:
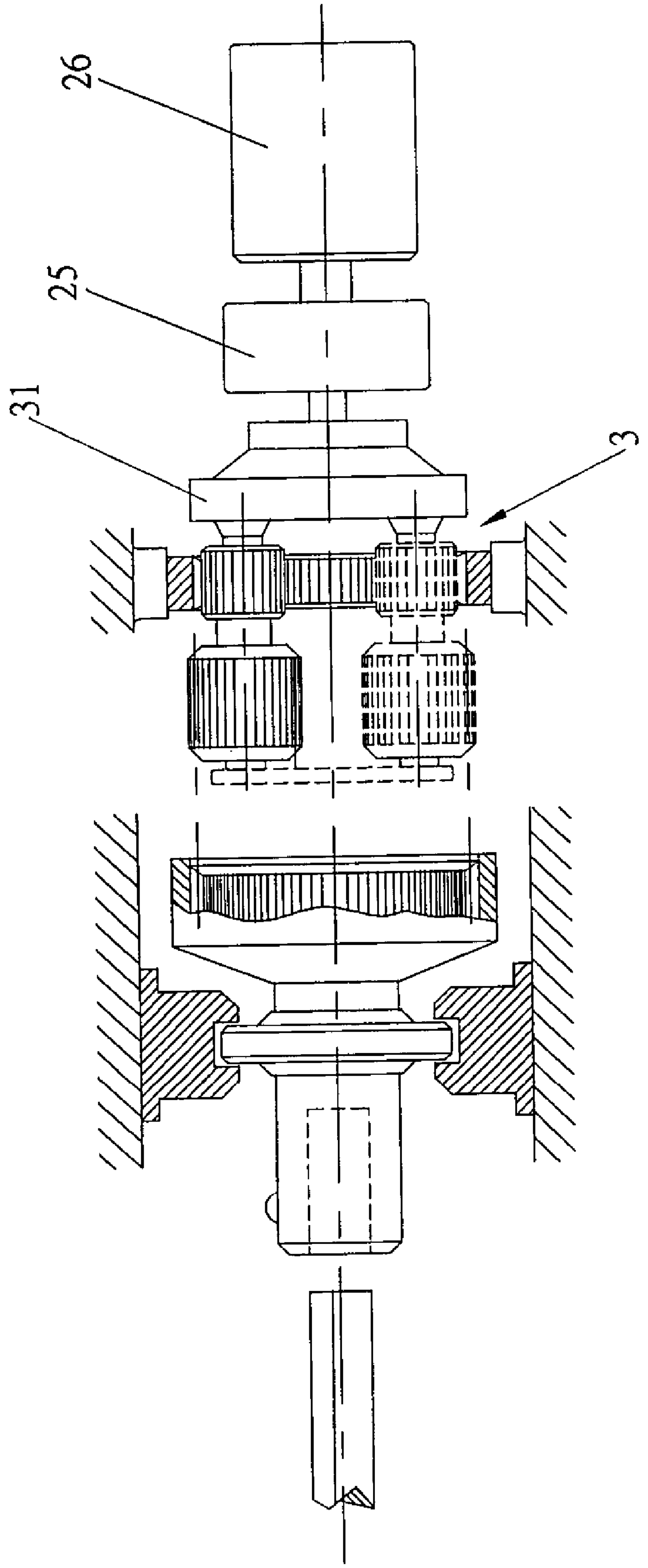
FIG. 9 shows a perspective view of an electric driven mechanism of the present invention.

Referring to FIG. 9. Other than manually operating the drive assembly 2, an electric motor 26 can be used to drive the rotary disk 31, with a reduction gear forming in the middle to adjust for a different speed requirement.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A reverse-stop mechanism for a curtain comprising:

a) a drive assembly;

b) a compound gear set being controlled by the drive assembly and having:

i) a rotary disk being connected to the drive assembly;

ii) a first planetary gear; and iii) a second planetary gear, the first planetary gear is located between the rotary disk and the second planetary gear;

c) a case;

d) a first annular gear fixedly connected to the case, the first planetary gear engaging the first annular gear;

e) a second annular gear rotatably connected to the case and engaging the second planetary gear, the case limiting an axial movement of the second annular gear, the second annular gear has a diameter larger than a diameter of the first annular gear; and f) a transmission shaft connected to the second annular gear.

2. The reverse-stop mechanism according to claim 1, wherein the second annular gear includes a fixing disk connected to the base.

3. The reverse-stop mechanism according to claim 1, wherein the drive assembly includes a chain wheel and a bead chain driving the chain wheel.

4. The reverse-stop mechanism according to claim 1, wherein the drive assembly includes a bevel wedge gear and a handle driving the bevel wedge gear.

5. The reverse-stop mechanism according to claim 1, wherein the drive assembly includes an electric motor driving the rotary disk.

6. The reverse-stop mechanism according to claim 1, further comprising an augment gear connected between the drive assembly and the rotary disk.

* * * * *